United States Patent [19]

Neuman

[11] 4,054,273

[45] Oct. 18, 1977

[54] DISPERSION APPARATUS FOR INJECTION MOLDING FILTER

[75] Inventor: Clayton L. Neuman, Coon Rapids, Minn.

[73] Assignee: A-1 Engineering, Inc., Coon Rapids, Minn.

[21] Appl. No.: 712,610

[22] Filed: Aug. 9, 1976

[51] Int. Cl.² .................... B01F 15/02; B29B 1/06
[52] U.S. Cl. ................................. 366/69; 366/96
[58] Field of Search .............. 259/4 R, 4 AB, 4 AC, 259/18, 36, 185; 138/38, 42

[56] References Cited

U.S. PATENT DOCUMENTS

| 2,583,206 | 1/1952 | Borck | 259/4 AB |
|---|---|---|---|
| 3,008,808 | 11/1961 | Hodges | 259/4 AB |
| 3,378,234 | 4/1968 | Svec | 259/4 AB |
| 3,554,496 | 1/1971 | Nusstein | 259/4 AB |
| 3,865,352 | 2/1975 | Nelson | 259/4 AB |

Primary Examiner—Robert W. Jenkins
Attorney, Agent, or Firm—Merchant, Gould, Smith, Edell, Welter & Schmidt

[57] ABSTRACT

The disclosure is directed to dispersion apparatus for use with injection molding systems for thoroughly mixing hot melted plastic with coloring or other additives before injection into a mold. Dispersion is accomplished by passing the hot melted plastic through a chamber in which a plurality of smooth, spherical bodies are disposed. Each of the spherical bodies is formed with a plurality of peripheral grooves which are orthogonal and generally lie within planes passing through diameters of the body.

25 Claims, 9 Drawing Figures

U.S. Patent    Oct. 18, 1977    4,054,273
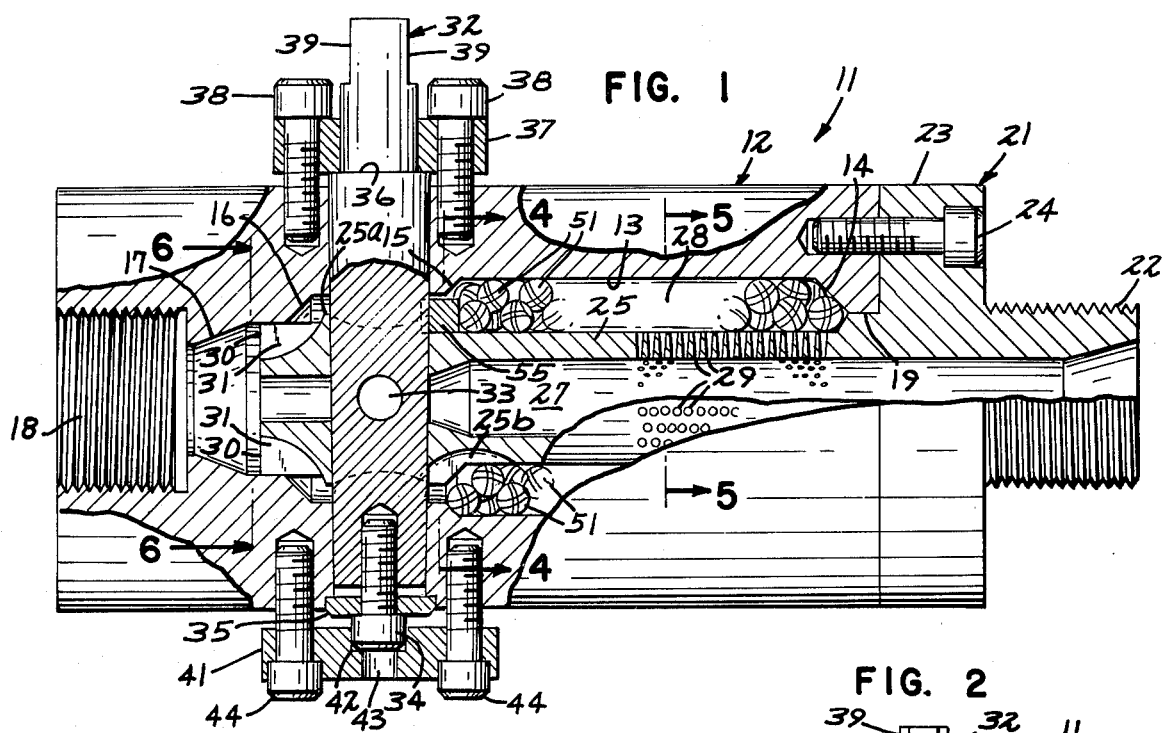
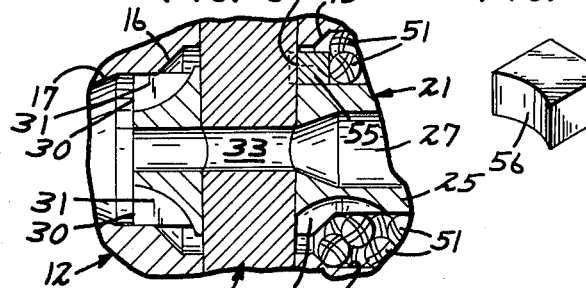
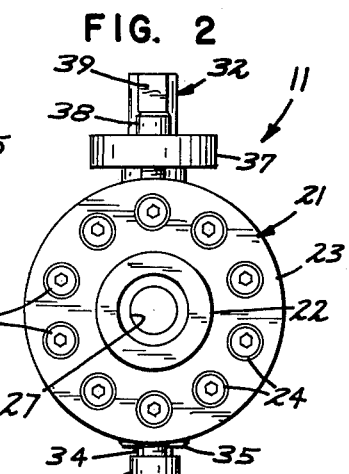
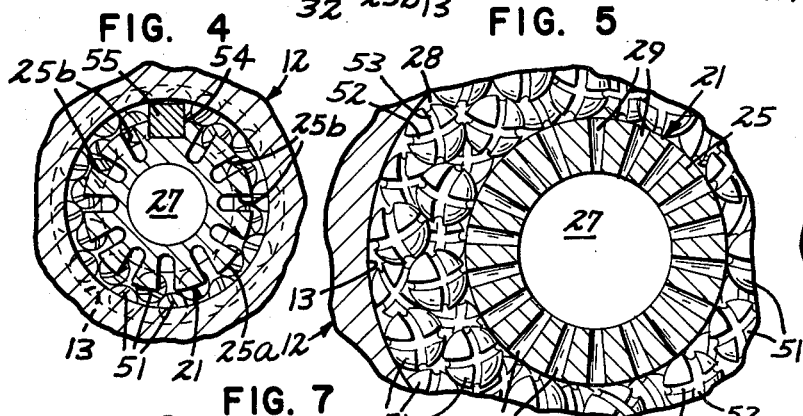
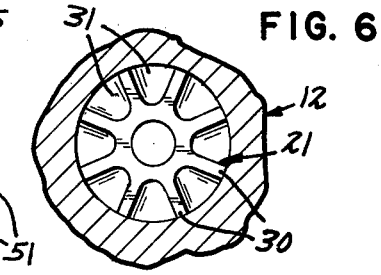
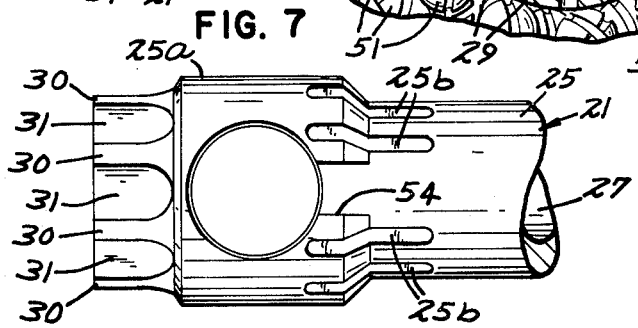
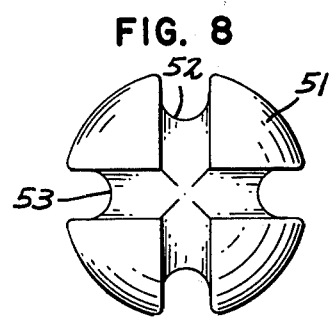

DISPERSION APPARATUS FOR INJECTION MOLDING FILTER

The invention relates generally to injection molding with hot plastic, and is specifically directed to dispersion apparatus for thoroughly mixing hot melted plastic with coloring or other additives before injection into a mold.

In the process of producing plastic articles by injection molding, it has become recognized that preparation of the plastic prior to injection is of utmost importance in producing high quality articles. The pre-injection plastic is normally in solid, pellet form for ease of handling and packaging. The pellets are usually of a single neutral color, requiring the use of color additives to achieve the desired results. In the production of toys and other articles where fire is a hazard, there may be a requirement for the addition of a fire retardant.

In preparing the plastic for injection, the plastic pellets are melted and maintained at a particular temperature or within a range of temperatures until injection takes place. Before or during melting, additives for color, fire retardation and the like are added. At this point in the process, the plastic, although being at the proper temperature and having the required constituents, is not adequately prepared. Initially, the plastic must be filtered to remove impurities, bits of unmelted plastic and the like. The failure to properly filter the highly viscous melted plastic results in molded articles having imperfections, uneven formation and generally lower quality. U.S. Pat. Nos. 3,767,056 and 3,825,123, which issued on Oct. 23, 1973 and July 23, 1974, respectively, to Gordon E. Neuman, both of which are assigned to the assignee of this invention, disclose two different forms of injection molding filters.

Where additives to the melted plastic are necessary, the preparation of plastic also necessarily includes dispersing or intermixing the additives with the melted plastic to insure a homogeneous mixture prior to injection. As pointed out above, the hot melted plastic is highly viscous, and suffers degradation due to excessive shear forces if the mixing is excessive or too violent. On the other hand, the intermixing must be sufficiently thorough to avoid color streaking or improper dispersion of the flame retardant.

A dispersion chamber is disclosed in the aforementioned U.S. Pat. No. 3,825,123, in which the plastic is initially filtered and then forced into a vortex flow to accomplish intermixing of the melted plastic and additives.

This invention is broadly directed to apparatus for dispersing hot melted plastic for use in an injection molding system. The inventive apparatus is capable of independent use, although in its preferred form it is adapted for use with an injection molding filter quite similar to the structure disclosed in the aforementioned U.S. Pat. No. 3,767,056. The patented filter is specifically adapted for use in high pressure injection molding apparatus, and consists of a housing having a material flow inlet and outlet. A longitudinal bore extends to the housing, communicating with the inlet and outlet. A cylindrical member having a plurality of radially disposed filtration openings is positioned in the longitudinal bore to define first and second concentrically disposed flow passages. A valve member comprising a tapered pin with a transverse bore registrable with the first passage is rotatable to either block the first passage and thereby effect filtering flow through the radially disposed holes and second passage, or to permit a purge flow through the essentially unrestricted first passage.

In the preferred embodiment, the dispersion apparatus used with the patented filter comprises a plurality of spherical members disposed in the annular chamber immediately downstream of the radially disposed filtration openings. Each of the spherical members includes two peripheral channels or grooves which generally are transverse to each other, and specifically are disposed in orthogonal planes which pass through diameters of the spherical member. In the preferred form, the spherical members are of the same size, the diameter of each being slightly greater than one-half the annular dimension of the chamber; i.e., the radial distance from the outer surface of the cylindrical insert member to the inner surface of the longitudinal bore. This dimensional relationship assists in maintaining the spherical members in a static position throughout the filtering and dispersing process.

The invention broadly contemplates the provision of means for creating a plurality of tortuous channels for serpentine paths that change direction, causing the material to repeatedly divide and reunite, causing the material to intermix gently and without creating shear forces which degrade the material. Such means could take the form of a solid member in which a plurality of serpentine bores are formed, or a plurality of members of other geometric configurations could be used. In the preferred embodiment, the smooth outer surface of the spherical members coupled with the minimal contact therebetween creates extremely smooth flow without causing obstructions to the material or significantly increasing back pressure. The peripheral grooves are particularly helpful in establishing smooth, continuous flow while at the same time accomplishing the desired objective of full intermixture and homogeneity of the melted plastic.

Although dispersion can be accomplished prior to filtration, it is quite obvious that the dispersion means may itself act in a filtering capacity and thereby become clogged with impurities and unmelted bits of plastic. For this reason, the dispersion apparatus of the preferred embodiment is disposed immediately downstream of the filtration openings so that the dispersing function is more efficiently performed on the fully filtered material.

BRIEF DESCRIPTION OF THE DRAWINGS

FIG. 1 is a side elevational view of a filtering device embodying the inventive dispersion apparatus, parts thereof being broken away and shown in section, the device being shown in a first operating position;

FIG. 2 is an end view of the filtered device as seen from right to left in FIG. 1;

FIG. 3 is a fragmented view of FIG. 1 of the filter device shown in a second operating position;

FIG. 4 is a fragmentary sectional view taken along the line 4—4 of FIG. 1;

FIG. 5 is an enlarged sectional view taken along the line 5—5 of FIG. 1;

FIG. 6 is a sectional view taken along the line 6—6 of FIG. 1;

FIG. 7 is an enlarged fragmentary view in top plan of the insert member of the filtering device which defines concentric flow passages, showing with particularity the entrance channel for the individual dispersion members;

FIG. 8 is an enlarged view of a spherical dispersion member; and

FIG. 9 is a view in perspective of a plug element of this apparatus.

DESCRIPTION OF THE PREFERRED EMBODIMENT

With reference to the figures, a filtering device for use in high pressure injection molding apparatus is represented generally by the numeral 11. Device 11 consists of a cylindrical member 12 having a longitudinal bore 13 of constant diameter. Each end of bore 13 terminates in an annular stepped-down region, designated 14, 15, respectively, such regions serving to evenly distribute forces generated by internal pressure. These annular regions 14, 15 preferably define a 45° angle with the longitudinal axis of the device.

The flow of material is from right to left as viewed in FIG. 1. Continuing forwardly of the stepped region 15 (with reference to the direction of material flow), the cylindrical member 12 includes another stepped-down region 16, which also preferably defines a 45° angle with the longitudinal axis, and a further stepped-down region 17 which is of greater axial dimension and forms an angle of less than 45° with the longitudinal axis. Beyond the stepped region 17 is an internally threaded outlet 18 through which filtered, thoroughly mixed hot plastic passes to the injection molding machine.

Immediately rearward or upstream of the stepped region 14 is a short bore 19 of lesser diameter than the bore 13 and having a diameter machined to a predetermined close tolerance for a purpose set forth below.

As described, the bores 13, 19, stepped regions 14–17 and outlet 18 define an irregular flow passage within cylindrical member 12. Projecting into the inlet end of the irregular passage and in axial alignment therewith is a filtering member represented generally by the numeral 21. Filtering member 21 has an external portion comprising a threaded inlet 22 adapted for connection to the source of melted plastic, and a collar 23 which abuts the end of cylindrical member 12 and is rigidly secured thereto by a plurality of Allen machine screws 24.

A tubular member 25 projects inwardly from collar 23, the outer diameter of such member providing a sealed, interference fit with the short bore 19.

The inside of tubular member 25 defines a first passageway 27, and a second passageway 28 is defined between the outer surface of tubular member 25 and the inner surface of the irregular flow passage as defined by longitudinal bore 13 and the stepped regions 14–16. Passageway 27 is continuous, establishing internal communication between inlet 22 and outlet 18. Passageway 28 is annular in shape, concentrically disposed with respect to passageway 27 and communicates directly with outlet 18. Passageway 28 communicates with passageway 27 and inlet 22 through a plurality of radially disposed filter openings 29. Preferably, filter openings 29 are arranged in a plurality of circumferential rows, the openings 29 of each row being offset or staggered with respect to the openings of adjacent rows. Each of the filter openings 29 increases a cross section from passageway 27 to passageway 28 to insure that any particle capable of entering the opening will leave the opening and thereby preclude clogging. In the preferred embodiment, the entrance of each filter opening 29 is 0.038 inches, and its outlet is 0.060 inches.

As shown in FIGS. 1 and 6, the extreme end of filtering member 21 terminates in a nozzle-like configuration consisting of flow guiding fins 30 and streamline flow regions 31 alternately disposed therebetween. As shown in FIG. 1, the streamline flow regions 31 are convex, and with the fins 30 establish smooth, straight and continuous flow of the filtered and mixed melted plastic as it leaves the passageway 28 and enters outlet 18. This structure is of particular importance in that it insures continuous flow of all material passing from passageway 28 and precludes the accumulation of melted material at any point. Thus, when material of a different color is passed through the filtering device 11, the possibility of bleeding of a previously accumulated quantity of an earlier-used color is eliminated.

Both the cylindrical member 12 and filtering member 21 have transverse bores formed therethrough which align when the filtering member 21 is properly oriented. These transverse bores are adapted to receive a valve member 32 which, as shown in FIGS. 1 and 2, is slightly tapered to provide a friction fit. Valve member 32 has a bore 33 formed therein which registers with passageway 27 with proper rotation of valve member 32 (FIG. 3). With valve member 32 rotated to the position shown in FIG. 1, the passageway 27 is completely blocked, and all material must pass through filter openings 29 and into passageway 28.

In view of the extremely high pressure to which the filter device 11 is subjected, it is necessary to prevent rotation of the valve member 32 once it has been placed in the desired operating position. To this end, the bottom end of valve member 32 is drilled and tapped as shown in FIG. 1 to receive a machine screw 34 which pulls through a recessed washer 35. It will be appreciated that rotation of screw 34 in a clockwise direction will draw valve member 32 further into its transverse bore to effect a greater friction fit.

The upper end of valve member 32 includes a step 36 adapted to receive a collar 37. A pair of machine screws 38 pass through collar 37 and are threadably received in cylindrical member 12 to force the valve member 32 into its transverse bore and thereby increase the friction fit.

The extreme upper end of valve member 32 includes flat machined portions 39 to receive a wrench or the like for rotating the valve upon loosening the screws 34 and 38. To assist in loosening the valve member 32 for rotation between operating and blocking positions, a second collar 41 is included. Collar 41 is formed with a recess 42 to receive the head of screw 34, and a center bore 43 which permits access to the screw 34 for tightening and loosening. Collar 41 is held in abutting relation with the screw 34 by a pair of machine screws 44, which extend through the collar and are threadably received within cylindrical member 12. As such, screw 34 may be turned counterclockwise, which has the effect of forcing the valve member 32 out of its tapered opening for removal or rotation.

As hereinabove described, the device 11 is capable of thoroughly filtering the hot melted plastic as it enters the passageway 27, passing through the filter openings 29, into the annular passageway 28 and out of the outlet 18. To fully prepare the melted plastic prior to injection into the mold, a plurality of spherical members 51 are disposed in the annular passageway 28. With reference to FIG. 8, each of the spherical members 51 defines a smooth, continuous outlet surface and is formed with a pair of peripheral grooves 52, 53 which are recessed from the outer surface. The grooves 52, 53 are orthogonal and generally lie within planes passing through diameters of the member 51. In view of the extremely high pressures involved, spherical members 51 must be made from hard, wear-resistant material such as hardened steel. Preferably, the exposed outer surfaces of the spherical members 51 are polished. To this end, the members 51 may be formed from spherical balls and the grooves 52, 53 machined therein, or the members 51 may be cast in the desired form and abrasively tumbled to acquire the polished surface.

With reference to FIG. 1, the spherical members 51 are preferably all of the same size, and the diameter of each is slightly greater than one-half the annular distance between the outer surface of tubular member 25 and the inner surface of the longitudinal bore 13. This dimensional relationship reduces the possibility of the spherical members 51 moving relative to one another during the intermixing process.

The annular passageway 28 is filled with the spherical members 51 to the extent that little or no relative movement between the spherical members 51 can occur, and the stepped-down regions 14, 15 assist in this respect.

With reference to FIGS. 1 and 7, tubular member 25 is enlarged (as indicated by the reference numeral 25a) in the area where the transverse valve member 32 is received. Due to this enlargement, the flow area immediately downstream of the passageway 28 is somewhat reduced in size, having a lesser annular dimension than the diameter of the spherical members 51 to preclude their entry. However, the existence of the spherical members 51 in that annular region which decreases in flow area creates a restriction to flow, and a plurality of radially arranged, longitudinal channels 25b are formed in the tubular member 25. As shown in FIG. 7, each of the longitudinal channnesl 25b extends from a point just upstream of the enlargement 25a into the enlargement 25a. As such, the longitudinal channels 25b supplement the annular flow passageway and preclude an unnecessary pressure drop in that region. As shown in FIG. 1, the bottom of each longitudinal channel 25b is convexly curved so that flow is smooth and continuous, and the radial arrangement of the channels 25b initiates straight flow which is furthered by the fins 30 and convex flow areas 31.

The spherical members 51 are inserted into the passageway 28 after the device 11 is partially assembled. To this end, a channel 54 is formed in the tubular member 25, extending longitudinally through the enlargement 25a until it reaches the transverse bore. As shown in FIGS. 1 and 7, the width of the channel 54 is slightly greater than the diameter of the spherical members 51, and its bottom is an extension of the main outer surface of tubular member 25. Accordingly, with the valve member 32 removed, access to the annular passageway 28 is gained through the transverse bore and channel 54. After the passageway 28 has been filled with spherical members 51, a metallic plug 55 is inserted into the channel 54, substantially filling the same, and the valve member 32 is inserted into its transverse bore thus blocking the channel 54 and maintaining the spherical members 51 in place. The plug 55 has a flat inner end which abuts an adjacent one of the spherical members 51 and a curved outer end 56 that corresponds to the curvature of the valve member 32 so as to provide for optimum wear characteristics therebetween. In operation, the outlet 18 of filter device 11 is connected to a suitable injection molding nozzle, not shown, and the inlet 22 is connected to a source of melted plastic under high pressure. Assuming that the filter openings 29 are totally unclogged, the valve member 32 is rotated to the position shown in FIG. 1 so that the passageway 27 is completely blocked, and screws 34 and 38 are tightened. As the flow of melted plastic enters the passageway 27, it is forced radially outward through the filter openings 29 to remove all impurities and particles which could have an adverse effect on the end product. After leaving the filter openings 29, the melted plastic enters passageway 28 and is thoroughly intermixed by the random position of the grooved spherical members 51. In this regard, it is noted that the spherical configuration gives rise to a minimal contact area between each of the spherical members 51 and adjacent members and/or surfaces defining the passageway 28. Coupled with the polished surfaces to which the flow of material is exposed, the possibility of obstruction, hindrance of flow hang up is substantially diminished; and coupled with the polished exposed surfaces of the spherical members 51, the flow is not only tortuous and serpentine to obtain the desired intermixing, but also smooth, gentle and continuous to avoid degradation of the material. The repeated division and rejoining of material flow is accomplished through the random disposition of the spherical members 51, and the grooves 52, 53 greatly facilitate flow through the passageway 28 and prevent an unnecessary flow buildup.

As pointed out above, impurities greater in size than the entrance of the filter openings 29 are precluded from passing therethrough so that the flow of material passing through the spherical members 51 is free of impeding impurities. The filtered impurities and other material are retained in passageway 27 until subsequently purged. Any impurity or the like small enough to pass through the entrance of a filter opening 29 is deemed to have a negligible effect on material quality; and the expanding cross sectional area of openings 29 insures that such particles will leave the area of filtration and not serve to clog it.

The annularly stepped portions 14, 15 serve to evenly distribute the extreme pressure load to the cylindrical member 12, thus precluding destructive forces from acting on the structurally weaker filtering member 21.

Upon accumulation of a predetermined quantity of impurities or the like at the end of passageway 27, screws 34, 38 are loosened and screws 44 are tightened to effect loosening of the valve member 32 in its tapered bore. The valve member 32 is then moved to the position shown in FIG. 3 whereupon such impurities are purged from the filtering device 11 by virtue of the essentially unrestricted flow through passageway 27. Upon completion of the purge flow, valve member 32 is returned to the position shown in FIG. 1, screws 44 are loosened to permit re-entry of the valve member 32 into its tapered bore, and screws 34, 38 are retightened to provide further filtration and dispersion of the melted plastic.

What is claimed is:

1. Apparatus for dispersing flowable material, comprising:
   a. a housing defining a dispersion chamber;
   b. inlet means for admitting flowable material to the chamber;
   c. outlet means for discharging dispersed flowable material from the chamber;
   d. a plurality of spherical bodies within the chamber in contacting engagement with each other and with the chamber wall, and defining tortuous paths therebetween to disperse the material;

e. each of said bodies having at least one groove formed therein which extends substantially around its periphery to assist in dispersing the flowable material and to reduce back pressure in the chamber.

2. The apparatus defined by claim 1, wherein the bodies are substantially the same size.

3. The apparatus defined by claim 1, wherein the bodies are formed from wear resistant material.

4. The apparatus defined by claim 1, wherein the surface of each of the bodies is polished.

5. The apparatus defined by claim 1, wherein each of said bodies is spherical, and each has two grooves formed therein which extend substantially around the periphery of the sphere.

6. The apparatus defined by claim 5, wherein the grooves are orthogonal.

7. The apparatus defined by claim 6, wherein each groove lies essentially within a plane passing through a diameter of the sphere.

8. The apparatus defined by claim 5, wherein the spherical bodies are substantially the same size.

9. The apparatus defined by claim 8, wherein the spherical bodies are formed from wear resistant material and have polished surfaces.

10. Apparatus for preparing melted plastic to be delivered under high pressure to injection molding apparatus, comprising:
  a. a housing having an inlet through which a flow of plastic is received and an outlet through which melted plastic may leave;
  b. means for filtering the plastic disposed between the inlet and outlet;
  c. the housing defining a dispersion chamber downstream of the filter means;
  d. a plurality of spherical bodies disposed within the chamber in contacting engagement with each other and with the chamber wall, and defining tortuous paths therebetween to disperse the material;
  e. each of said bodies having at least one groove formed therein which extends substantially around its periphery to assist in dispersing the melted plastic and to reduce back pressure in the dispersion chamber.

11. The apparatus defined by claim 10, wherein the bodies are substantially the same size.

12. The apparatus defined by claim 10, wherein each body has two grooves formed therein which extend substantially around the periphery of the sphere.

13. The apparatus defined by claim 12, wherein the grooves are orthogonal.

14. The apparatus defined by claim 13, wherein each groove lies essentially within a plane passing through a diameter of the sphere.

15. The apparatus defined by claim 14, wherein the spherical bodies are formed from wear resistant material and have polished surfaces.

16. Apparatus for preparing melted plastic to be delivered under high pressure to injection molding apparatus, comprising:
  a. a housing having an inlet through which a flow of melted plastic is received, an outlet through which melted plastic may leave and a longitudinal bore of predetermined diameter formed therein;
  b. a rigid tubular filtering member of lesser diameter than the longitudinal bore, and having a plurality of radially disposed filter openings formed therethrough;
  c. the tubular filtering member being disposed in the longitudinal bore and engageably received by the housing in supporting relation thereby;
  d. a first flow passage establishing fluid communication between the housing inlet and outlet and defined in part by the inside of the tubular member;
  e. a second flow passage establishing fluid communication between the housing inlet and outlet and defined in part by the filter openings and space between the tubular member and the housing;
  f. a plurality of bodies disposed within the space between the tubular member and housing in contacting engagement with each other and with the housing inner wall, and defining tortuous paths therebetween to disperse the material;
  g. each of said bodies having at least one groove formed therein which extends substantially around its periphery to assist in dispersing the melted plastic;
  h. and valve means disposed in the first passage downstream of the filter openings, the valve means being moveable to a first position for blocking the first flow passage to effect the flow of melted plastic through the second flow passage, and moveable to a second position to open the first flow passage and purge filtered particles therefrom.

17. The apparatus defined by claim 16, wherein each of the bodies is spherical in shape.

18. The apparatus defined by claim 17, wherein the bodies are substantially the same size.

19. The apparatus defined by claim 18, wherein the diameter of each spherical body is slightly larger than one-half the annular distance between the outer surface of the tubular member and the inner surface of the longitudinal bore.

20. The apparatus defined by claim 19, wherein each spherical body has two grooves formed therein which extend substantially around the periphery of the sphere.

21. The apparatus defined by claim 20, wherein the grooves are orthogonal.

22. The apparatus defined by claim 21, wherein each groove lies essentially within a plane passing through a diameter of the sphere.

23. The apparatus defined by claim 22, wherein the spherical bodies are formed from wear resistant material and have polished surfaces.

24. Apparatus for dispersing flowable material, comprising:
  a. a housing defining a dispersion chamber;
  b. inlet means for admitting flowable material to the chamber;
  c. outlet means for discharging dispersed flowable material from the chamber;
  d. a plurality of bodies disposed within the chamber in contacting engagement with each other and with the chamber wall, and defining tortuous paths therebetween to disperse the material;
  e. each of said bodies defining a smooth, continuous outer surface and having at least one groove formed therein which is recessed from said outersurface and extends substantially around its periphery to assist in dispersing the flowable material and to reduce back pressure in the chamber.

25. Apparatus for preparing melted plastic to be delivered under high pressure to injection molding apparatus, comprising:

a. a housing having an inlet through which a flow of plastic is received and an outlet through which melted plastic may leave;
b. means for filtering the plastic disposed between the inlet and outlet;
c. the housing defining a dispersion chamber downstream of the filter means;
d. a plurality of bodies disposed within the chamber in contacting engagement with each other and with the chamber wall, and defining tortuous paths therebetween to disperse the material;
e. Each of said bodies defining a smooth, continuous outer surface and having at least one groove formed therein which is recessed from said outer surface and extends substantially around its periphery to assist in dispersing the melted plastic and to reduce back pressure in the dispersion chamber.

* * * * *

UNITED STATES PATENT AND TRADEMARK OFFICE
CERTIFICATE OF CORRECTION

PATENT NO. : 4,054,273
DATED : October 18, 1977
INVENTOR(S) : Clayton L. Neuman

It is certified that error appears in the above-identified patent and that said Letters Patent are hereby corrected as shown below:

Column 4, line 67, the word "outlet" should be changed to the word --outer--.

Column 5, line 36, the word "channesl" should be changed to the word --channels--.

Signed and Sealed this

Twenty-first Day of February 1978

[SEAL]

Attest:

RUTH C. MASON
Attesting Officer

LUTRELLE F. PARKER
Acting Commissioner of Patents and Trademarks